United States Patent [19]

Scholl et al.

[11] 4,021,521
[45] May 3, 1977

[54] MANUFACTURE OF WORK-HARDENED WIRES AND PROFILES

[75] Inventors: Karl Heinz Scholl, Lambsheim; Gerhard Grimm, Altrip, both of Germany

[73] Assignee: BASF Aktiengesellschaft, Ludwigshafen, Germany

[22] Filed: July 21, 1975

[21] Appl. No.: 597,658

[30] Foreign Application Priority Data

July 31, 1974 Germany .................... 2436874

[52] U.S. Cl. .......................... 264/108; 264/210 R; 264/211; 264/235; 264/237; 264/294; 264/320; 264/346
[51] Int. Cl.² .......................................... B29D 7/14
[58] Field of Search ............ 264/108, 122, 176 R, 264/177 R, 210 R, 211, 235, 237, 280, 284, 290 R, 346, 349, 320, 294

[56] References Cited
UNITED STATES PATENTS

| | | |
|---|---|---|
| 2,291,670 | 8/1942 | Wiley et al. .................... 264/210 R |
| 2,414,226 | 1/1947 | Everett .......................... 264/290 R |
| 2,867,004 | 1/1959 | Levison et al. ................ 264/176 R |
| 3,060,552 | 10/1962 | Scheyer ............................ 264/108 |
| 3,064,391 | 11/1962 | Devol ............................... 264/108 |
| 3,404,203 | 10/1968 | Donald ............................. 264/209 |
| 3,522,342 | 7/1970 | Nungesser et al. ............... 264/211 |
| 3,592,954 | 7/1971 | Widdowson ...................... 264/108 |

Primary Examiner—Jeffery R. Thurlow
Attorney, Agent, or Firm—Johnston, Keil, Thompson & Shurtleff

[57] ABSTRACT

A process for the manufacture of wires and profiles, wherein thermoplastics are first mixed, in the melt, with from 5 to 40 per cent by weight (based on the mixture) of aluminum needles of length from 0.3 to 6 mm, of average diameter from 0.02 to 0.1 mm and of length to average diameter ratio of from 3 to 100, the mixture is extruded to give a wire or profile in which the aluminum needles are substantially oriented axially, and this wire or profile is finally hardened by cold-working.

10 Claims, 1 Drawing Figure

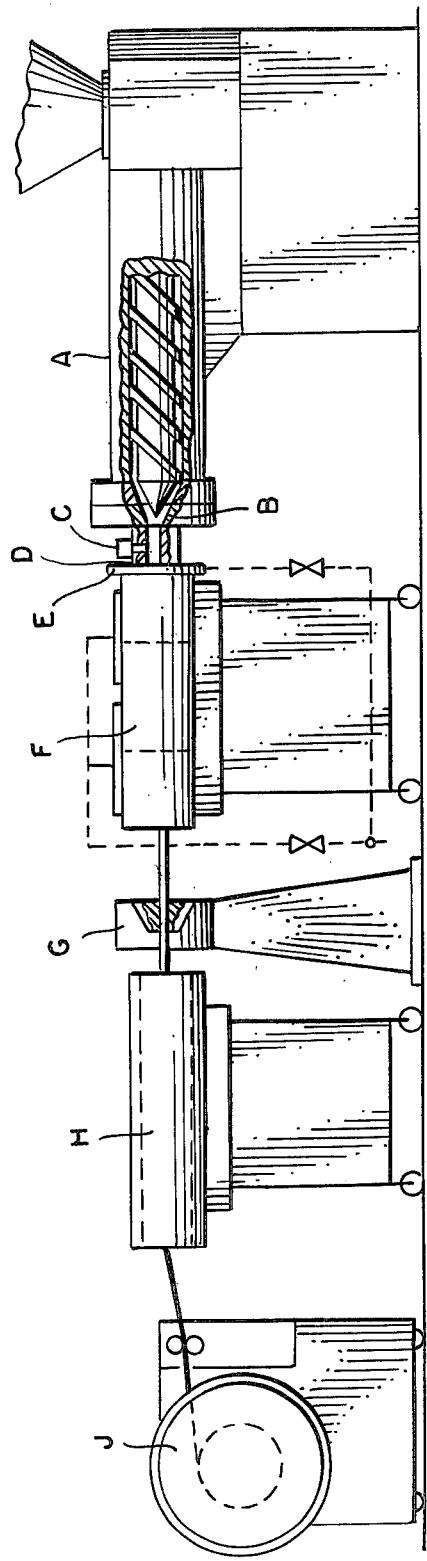

MANUFACTURE OF WORK-HARDENED WIRES AND PROFILES

Work-hardening and cold-working processes have hitherto not attained any importance in the plastics processing field, whilst such processes are of outstanding significance in metal-working.

It is an object of the present invention to provide a process for the manufacture of work-hardened wires and profiles based on thermoplastics. Such wires and profiles should be processable by cold-working, to give high quality moldings, e.g. screws.

The most important cold-working processes are cold upsetting, drawing and (cold) extrusion, or combinations of these. The outstanding characteristics of these processes are that they are highly economical and ensure optimum material utilization.

The cold-working processes require, inter alia, that the material to be worked should have the following properties:
1. Inherent ductility.
2. High dimensional accuracy in respect of the cross-section and length of billets.
3. Ductility even at high forming speeds.
4. A low degree of springback after forming.
5. Accuracy of the finished article.

Of these criteria, plastics which may be considered for cold-working at most conform to item 1. Ultimately, the failure to conform to items 2 to 5 is the reason why cold-working processes have hitherto found virtually no acceptance in plastics processing.

It is true that non-reinforced thermoplastics can be cold-worked but the finished articles are not dimensionally stable. Thermoplastics containing conventional reinforcing fillers, e.g. glass fibers, undergo destruction of the lattice on cold-working.

We have found that thermoplastics reinforced with aluminum needles are outstandingly suitable for the manufacture of work-hardened wires and profiles. Such wires and profiles can be processed by conventional ductile-metal-working techniques to give high quality moldings, e.g. screws.

The invention relates to a process for the manufacture of work-hardened wires and profiles from thermoplastics reinforced with aluminum needles, wherein thermoplastics are mixed, in the melt, with from 5 to 40 per cent by weight (based on the mixture) of aluminum needles of length of from 0.3 to 6 mm, of average diameter of from 0.02 to 0.1 mm and of length to average diameter ratio of from 3 to 100, the mixture is extruded to give a wire or profile in which the aluminum needles are substantially oriented axially, and this wire or profile is hardened by cold-working.

Suitable starting materials are all thermoplastics, such as polyolefins, polyvinyl-aromatics, polyvinyl halides, polycarbonates, saturated polyesters, polyamides and polyacetals. The new process is of particular importance for high-grade thermoplastics having a modulus of elasticity of from 100 N/mm$^2$ to 2,000 N/mm$^2$ and a density of from 0.94 to 1.50 g/cm$^3$, especially for polyamides, e.g. nylon 6, nylon 6,6, nylon 6,10 and nylon 12. Further thermoplastics which are very suitable are high molecular weight polyolefins, especially polyethylene, having a modulus of elasticity of from 240 N/mm$^2$ to 300 N/mm$^2$ and a density of from 0.94 to 0.97 g/cm$^3$.

The reinforcing agents used are aluminum needles having a length of from 0.3 to 6 mm, preferably from 1 to 6 mm, an average diameter of from 0.02 to 0.1 mm and a length to average diameter ratio of from 3 to 100, preferably from 40 to 80. The amount of aluminum needles used is from 5 to 40 percent by weight, advantageously from 10 to 30 percent by weight, based on the mixture. It is particularly advantageous to use aluminum needles which are substantially free from oxide layers. Hence, a suitable method is to treat commercially available aluminum needles with acids, e.g. hydrochloric acid of about 20% strength, to remove the oxide layer.

The thermoplastic is mixed with the aluminum needles in the melt. Conventional extruders are conveniently used for this purpose, the screw of the extruders being so chosen that the shape of the aluminum needles is essentially maintained during melting and mixing. As a rule, a shallow screw is used, having a flight depth, in the feed zone, of from 1.2 to 1.5 times the length of the aluminum needles.

On subsequent extrusion to give a wire or profile, the aluminum needles should substantially become oriented axially if advantageous properties are to be attained. For this purpose, it is desirable to select a screw which has a flight depth in the output zone which is less than the length and greater than the thickness of the aluminum needles. For example, a flight depth of from 0.4 to 0.8 times the length of the aluminum needles may be chosen.

The screw tip together with the extruder die forms a conical annular gap, the narrowest point of which is wider than the average diameter of the aluminum needles in the mixture, but narrower than their length.

Beyond the conical tip, the channel opens into the extrusion die, the shape of which is determined by the billets to be manufactured. To ensure trouble-free extrusion it is advisable to fit a constrictor in the transition from the conical annular gap to the die.

The plastic material which issues from the extruder is passed to a cooling zone. To avoid micro-cavities which can form around the embedded aluminum needles in the thermoplastic molding materials, it is advisable to divide this cooling zone into several separately temperature-controlled zones. The temperature of the first temperature-controlled zone should be about 20° below the crystallite melting point of the thermoplastic molding material used. The temperature of the subsequent cooling zones should be so chosen that the extruded billets can follow the volume contraction on cooling. On leaving the cooling zone, the billets should not be above 50° to 60° C. At these temperatures, the goods can be further processed by cold-working.

When manufacturing wires based on nylon 6, the temperature in the first temperature-controlled zone is, e.g. from about 160° to 180° C; the wire is then cooled to from about 80° to 100° C (second temperature-controlled zone) and finally to from about 40° to 60° C (third temperature-controlled zone).

For hardening, the extruded wire or extruded profile is then cold-worked, especially by drawing in a drawing die. The drawing process is advantageously carried out by the conventional method used for drawing metal wires, e.g. by drawing the wire to from 2 to 10 times its length, corresponding to from 0.5 to 0.1 times its cross-section.

For the manufacture of wires, the drawing die is concentrically designed, with a conical intake gap. The angle of the cone is suitably from 30° to 90°. The forming zone of the die is cylindrical, the edge length of the cylinder being from 0.1 to 0.4 times the wire diameter. After the forming zone, the die widens out conically at an angle of about 3° to 10°. The diameter of the forming zone is determined by the degree of reduction desired or the degree of hardening desired. As may be seen from Table 1, considerable hardening is achievable even with moderate changes in length.

TABLE 1

| Change in length (%) | 5 | 10 | 15 | 20 | 25 | 30 | 35 |
|---|---|---|---|---|---|---|---|
| Nylon 6 + 15% by weight of aluminum needles*) | | | | | | | |
| Tensile strength (kp/mm²) | 6.2 | 6.3 | 6.5 | 6.8 | 7.4 | 9.2 | 11.5 |
| Elongation at break (%) | 5 | 4.2 | 3.8 | 3.1 | 2.8 | 2.5 | 2.3 |
| Springback (%) 8 hours after forming | 0.3 | 0.7 | 1 | 1.3 | 1.6 | 1.9 | 2 |
| Nylon 6, unfilled | | | | | | | |
| Tensile strength (kp/mm²) | 6 | 6.5 | 6.8 | 7.9 | 9.7 | 10.2 | 10.5 |
| Elongation at break (%) | 32 | 45 | 52 | 57 | 60 | 61 | 63 |
| Springback (%) 8 hours after forming | 0.8 | 1.4 | 2 | 2.6 | 3.2 | 3.8 | 4.3 |

The traction required for drawing is provided by a suitable draw-off device.

*)Average length 0.3 – 6 mm; average diameter 0.02 – 0.1 mm; length: average diameter ratio 3 : 100

To stabilize the hardening achieved, it is advisable to pass the formed billets under tension through an annealing zone. The annealing zone is suitably located between the forming die and the draw-off device. This has the advantage that additional expenditure on equipment can be avoided. The process sequence is shown schematically in FIG. 1. Herein, A = extruder, B = conical annular gap, C = constrictor, D = die, E = cooling ring, F = cooling zone, G = drawing die for cold-working, H = annealing zone, I = wind-up or profile haul-off.

The advantageous properties of the wires and profiles of the present invention may be seen from Table 2 which follows.

TABLE 2

| | Nylon 6, without reinforcement | Nylon 6, with 15% by weight of aluminum needles | Nylon 6, with 15% by weight of aluminum needles, cold-hardened by drawing in a drawing die |
|---|---|---|---|
| Tensile strength σ (kg/mm²) B | 5.8 | 7.3 | 16 |
| Elongation at break, | 120% | 5% | 1.8% |
| Modulus of elasticity E (kp/mm²) | 185 | 284 | 345 |
| Relaxation (length recovery) on compression with 50% change in length | 5.8% | 2.5% | 1.4% |

A surprising property of work-hardened wires and profiles according to the invention is that their ductility can be altered by cold-rolling. Thus, the elongation at break of a cold-hardened wire can be increased from 1.8% to 60% by cold-rolling. The cold-rolling of the wire or profile can be carried out not only after, but also before, work-hardening by drawing in a drawing die.

We claim:

1. A process for the manufacture of a work-hardened wire or profile from a thermoplastic material reinforced with aluminum needles comprising the following steps: mixing a polyamide or a polyolefin in the melt with from 5 to 40% by weight, based on the mixture, of aluminum needles of length from 0.3 to 6 mm, of average diameter from 0.02 to 0.1 mm and of length to average diameter ratio from 3 : 1 to 100 : 1; extruding the mixture to give a wire or profile in which the aluminum needles are substantially axially oriented; cooling the extruded wire or profile to a temperature not above 50° to 60° C;
hardening the wire or profile by drawing it to from 2 to 10 times its length;
and finally annealing it by passing it under tension through an annealing zone.

2. A process as claimed in claim 1, wherein melting and extrusion is effected by means of an extruder of which the screw has a flight depth of from 1.2 to 1.5 times the length of the aluminum needles in the intake zone (melting zone) and a flight depth of from 0.4 to 0.8 times the length of the aluminum needles in the output zone.

3. A process as claimed in claim 2, wherein the cold-working is effected by drawing in a drawing die (matrix) which has a conical entry zone with an angle of from 30° to 90°, a cylindrical forming zone of length from 0.1 to 0.4 times the diameter of the wire or profile, and a conical exit zone with an angle of from 3° to 10°.

4. A process as claimed in claim 3, wherein the wire or profile is rendered ductile by cold-rolling before or after hardening by drawing in a drawing die.

5. A process as claimed in claim 4, wherein the thermoplastics material has a modulus of elasticity of from 100 N/mm² to 2,000 N/mm² and a density of from 0.94 to 1.50 g/cm³.

6. A process as claimed in claim 1, wherein the aluminum needles used have been acid-treated to remove the oxide surface layer.

7. A process as claimed in claim 6, wherein the aluminum needles have a length from 1 to 6 mm and a length to average diameter ratio of from 40:1 to 80:1.

8. A process as claimed in claim 7, wherein the aluminum needles are used in an amount of from 10 to 30 percent by weight, based on the mixture.

9. A process as claimed in claim 8 wherein the extruded material passes into a cooling zone divided into a plurality of separately temperature-controlled regions prior to cold-working, the temperature of the first region being about 20° C below the crystallite melting point of the thermoplastics material and the temperature of the subsequent region(s) being lower such that the extruded material leaves the cooling zone at not more than 60°.

10. A process as claimed in claim 9, wherein the cold-worked wire or profile is subsequently annealed by passage under tension through an annealing zone located between the forming die and the draw-off device.

* * * * *